United States Patent [19]
Park et al.

[11] Patent Number: 5,664,437
[45] Date of Patent: Sep. 9, 1997

[54] COOL-AIR DUCT FOR REFRIGERATORS

[75] Inventors: Seak Haeng Park; Yong Myoung Kim, both of Suwon, Rep. of Korea

[73] Assignee: Samsung Electronics Co., Ltd., Suwon, Rep. of Korea

[21] Appl. No.: 553,443

[22] PCT Filed: May 24, 1995

[86] PCT No.: PCT/KR95/00063

§ 371 Date: Nov. 11, 1995

§ 102(e) Date: Nov. 11, 1995

[87] PCT Pub. No.: WO95/33963

PCT Pub. Date: Dec. 14, 1995

[30] Foreign Application Priority Data

| Jun. 2, 1994 | [KR] | Rep. of Korea | 1994-12402 |
| Jul. 19, 1994 | [KR] | Rep. of Korea | 1994-17426 |
| Jul. 19, 1994 | [KR] | Rep. of Korea | 1994-17427 |
| Jul. 20, 1994 | [KR] | Rep. of Korea | 1994-17513 |
| Dec. 10, 1994 | [KR] | Rep. of Korea | 1994-33558 |

[51] Int. Cl.$^6$ ........................... F25D 17/04
[52] U.S. Cl. ........................... 62/407; 62/441
[58] Field of Search ........... 62/404, 407, 408, 62/409, 440, 441

[56] References Cited

U.S. PATENT DOCUMENTS 4,058,989  11/1977  Horvay et al. ................ 62/441
5,551,252   9/1996  Lee ............................. 61/441

*Primary Examiner*—John M. Sollecito
*Attorney, Agent, or Firm*—Burns, Doane, Swecker & Mathis, L.L.P.

[57] ABSTRACT

A refrigerator includes a food storage compartment having a rear wall. Mounted on the rear wall is a vertical air duct for conducting cool air to the compartment. The air duct includes first and second vertical air passages, and a row of vertically spaced discharge openings disposed between the air passages. Each discharge opening includes first and second horizontally adjacent discharge portions, one of which extends higher than the other. The higher discharge portion communicates with a respective air passage by a branch duct. One of the branch ducts of each discharge opening intersects both its respective discharge portion and its respective air passage at higher levels than does the other branch duct of that same discharge opening. Each branch duct includes vertically spaced upper and lower walls, the lower wall projecting farther into the respective air passage than the upper wall. The lower wall of each branch duct projects farther into the air passage than does the lower wall of the next higher branch duct.

7 Claims, 14 Drawing Sheets

COOL-AIR DUCT FOR REFRIGERATORS

RELATED INVENTION

This invention is related to an invention disclosed in U.S. Ser. No. 08/537,789, filed Oct. 23, 1995.

BACKGROUND OF THE INVENTION

This invention relates to a cool-air duct for refrigerators which can efficiently direct cool air into a plurality of cool-air discharge openings which communicate with a refrigerating compartment.

As shown in FIG. 1, a conventional refrigerator is constructed by mounting a freezing compartment door 6 and a refrigerating compartment door 7 on a refrigerator body 4 of a thermally insulated structure consisting of a freezing compartment 2 and a refrigerating compartment 3 which are partitioned from each other by an intermediate partition wall 1 therebetween.

A compressor 11 is installed in the machine compartment 11M that is positioned under the refrigerating compartment 3. A condenser and capillary tube (not shown) are mounted in the interior of the body 4 or placed in the machine compartment 11M, while an evaporator 12 is mounted on the rear wall of the freezing compartment 2. These components are connected to each other by refrigerant tubes (not shown) to perform the refrigeration cycle.

A fan 13, for forcing cool air from the evaporator 12 into the freezing compartment 2 and the refrigerating compartment 3, is disposed above the evaporator 12. In order to guide the flow of the cool air, a grill 14 is placed in front of the fan 13 and a cool-air duct 15A is disposed on the rear wall of the refrigerating compartment 3. Here, the numeral 19 indicates a damper for controlling the quantity of cool air introduced into the refrigerating compartment 3, and the numeral 8 indicates shelves for receiving food items.

As a method for supplying cool air to the refrigerating compartment 3, a conventional refrigerator generally adopts a shelf-by-shelf cool-air discharging method. In this method, as shown in FIG. 2, a plurality of cool-air discharge openings 16A, B,C are provided for several areas partitioned by the shelves 8, and are arranged in a vertically spaced direction on the front of the cool-air duct 15A, in order that cool air can be discharged towards the front of each area formed by the plurality of the shelves 8.

However, in the above shelf-by-shelf cool-air discharging method only a small portion of the cool air from the evaporator 12 passes through the upper cool-air discharge opening 16A. Most of the cool air flows down along the cool-air duct 15A and finally discharges into the refrigerating compartment 3 through the lowest cool-air discharge opening 16C. This problem arises because the cool-air discharge openings 16A,B,C are formed perpendicularly to the flow direction of the cool air passing through the cool-air duct 15A. Accordingly, the upper and lower portions of the refrigerating compartment 3 constitute different temperature zones, respectively, so uniform cooling in the refrigerating compartment 3 can not be achieved. As a result, the food items on the upper shelves of the refrigerating compartment 3 can not maintain a proper refrigerating temperature, whereas the food items on the lower shelves are overcooled.

Furthermore, such a conventional refrigerator has demerit in that cool-air circulation in the refrigerating compartment 3 does not go smoothly, so not only does the cool air not reach the corners of the refrigerating compartment 3, but the temperature distribution in every direction of the space is not kept constant. Cool air is discharged only towards the front of the refrigerating compartment 3 due to the poor configuration of the cool-air duct aforementioned.

Even in the case where bulky food items may be near any of the cool-air discharge openings, blocking the cool-air flow, the cool-air circulation still does not improve significantly.

As a consequence, the food items in the refrigerating compartment 3 can not be stored in the most suitable condition.

As an attempt to distribute cool air more evenly throughout the compartment, a three-dimensional cool-air discharging method has recently been developed. As shown in FIG. 3, a refrigerator according to this method has a plurality of cool-air discharge openings 16S on the side walls of the refrigerating compartment 3 as well as cool-air discharge openings 16A, B,C on the rear wall, resulting in the discharge of cool air from the side walls as well as from the rear wall.

However, even in the above refrigerator, cool air is simply discharged in only one direction from each opening, without being dispersed in other directions. Accordingly, such a refrigerator fails to provide uniform cooling by creating portions that are exposed and not exposed to the cool air, depending upon the dimension and arrangement of food items.

Further, because the cool-air duct configuration in the three-dimensional cool-air discharging method is the same as that in the shelf-by-shelf cool-air discharging method, the cool air is not discharged in a sufficient amount through the upper cool-air discharge opening, whereas it is excessively discharged through the lower cool-air discharge opening. Therefore, the food items in the compartment can not be kept fresh at an uniform temperature even by the conventional refrigerator having three-dimensional cool-air discharge openings.

It is accordingly an object of this invention to provide a refrigerator with a cool-air duct that can evenly distribute cool air to the refrigerating compartment through its cool-air discharge openings and maintain all the areas of the refrigerating compartment at an uniform temperature.

Another object of this invention is to provide a refrigerator with a cool-air duct that can discharge cool air from each cool-air discharge opening into the right and left sides of a refrigerating compartment so as to circulate the introduced cool air evenly.

SUMMARY OF THE INVENTION

A refrigerator according to this invention includes a freezing compartment and a refrigerating compartment partitioned by an intermediate partition wall, an evaporator for generating cool air, a fan for circulating the generated cool air to the freezing and refrigerating compartments, and a cool-air duct disposed on the rear wall of the refrigerating compartment in order to guide the cool air to the refrigerating compartment.

The cool-air duct, which is the subject of this invention, comprises a cool-air inflow opening formed on the top portion of the duct for directing the cool air from the evaporator to the cool-air duct; a plurality of cool-air discharge openings formed longitudinally in the front of the cool-air duct to supply cool air to the refrigerating compartment; first and second cool-air passages which extend downward from the cool-air inflow opening and arranged on the right and left sides of the cool-air discharge openings, respectively; and a plurality of cool-air guiders which project from the top and bottom of each cool-air discharge opening in order to direct the cool air to each cool-air discharge opening from the first and second cool-air passages without communicating the first and second cool-air passages with each other.

Each cool-air guider includes a couple of shoulders which extend aslant towards the first and second cool-air passages from their top sides, respectively, and a couple of curved portions which join the right and left sides of the cool-air discharge openings.

By means of the curved portions of the higher cool-air guider and the shoulders of the lower cool-air guider, first and second branch passages are formed on the right and left sides of each cool-air discharge opening, respectively, and connect the first and second cool-air passages to each corresponding cool-air discharge opening.

Either one of the shoulders formed on the lower cool-air guider extend from the bottom of the corresponding cool-air discharge opening to the middle. On the other hand, the curved portion, which is formed on the higher cool-air guider opposite to the above extending shoulder, extends from the top of the corresponding cool-air discharge opening to the middle.

By means of the extending shoulders and curved portions, each cool-air discharge opening is divided into an upper portion (first cool-air discharge portion) and a lower portion (second cool-air discharge portion). The first and second branch passages join the upper and lower portions of the cool-air discharge opening, respectively. By using such a configuration, the cool air which is introduced to the first branch passage through the first cool-air passage and the cool air which is introduced to the second branch passage through the second cool-air passage can be discharged toward the left and right sides (viewed from FIG. 9A) of the refrigerating compartment, from the cool-air discharge opening, without ever colliding with each other.

The couple of shoulders, which are formed on the lower cool-air guider, extend toward the first and second cool-air passages farther than those of the higher cool-air guider, and the inlet portions of the lower first and second branch passages are wider than those of the higher first and second branch passages. Consequently more of the cool air flowing down along the first and second cool-air passages is discharged through the lower cool-air discharge opening than through the higher cool-air discharge opening.

Further, the position of the extending shoulder and curved portion for one cool-air discharge opening is reversed with respect to the extending shoulders and curved portions of the neighboring cool-air discharge openings. This is in order that the arrangement of the first and second branch passages, which join on opposite sides of one cool-air discharge opening with different levels, is reversed with respect to the first and second branch passages of the neighboring cool-air discharge openings.

By using such a configuration, the lower cool-air discharge opening, through which cool air of a higher temperature passes, can receive a larger amount of cool air than the upper cool-air discharge opening, through which cool air of a lower temperature passes. All areas of the refrigerating compartment can thereby be maintained at a uniform temperature.

Further, a couple of banks, for adjusting the amount of cool air passing through the opened bottom of the cool-air duct, are provided between the shoulders of the lowest cool-air guider and the first and second cool-air passages.

On the other hand, as another configuration of the cool-air duct according to this invention, a plurality of cool-air passages are individually branched from the cool-air inflow opening without ever communicating with each other. The passages are then connected to the right and left sides of each cool-air discharge opening, and thereby effectively discharge cool air into the refrigerating compartment.

The configuration and operation of the cool-air ducts, according to this invention, will be disclosed more clearly and in detail in the following embodiments described referring to the attached drawings.

DESCRIPTION OF THE PREFERRED EMBODIMENTS

Figure 1:
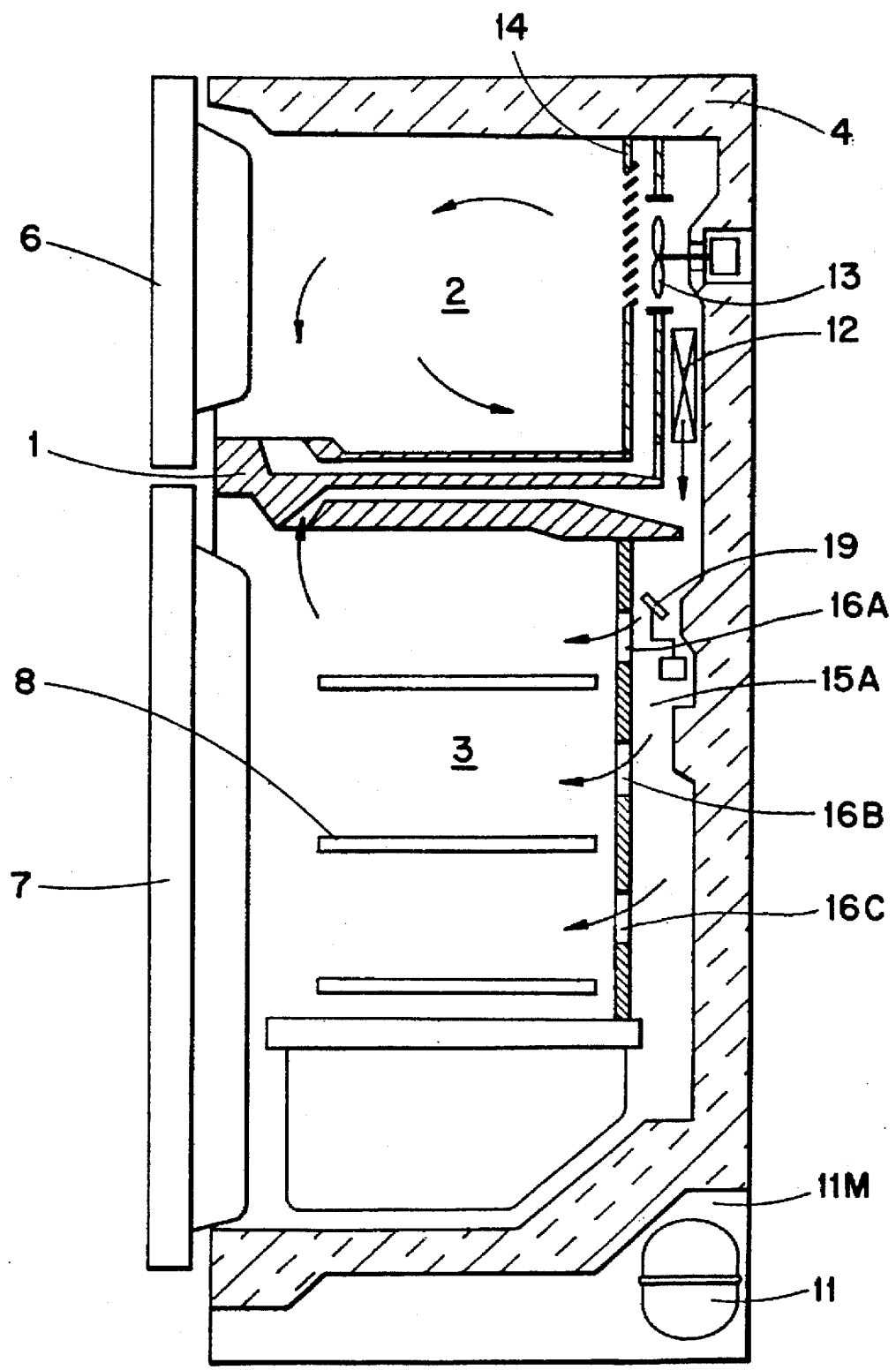
FIG. 1 is a longitudinal section showing a typical structure of a conventional refrigerator.
Figure 2:
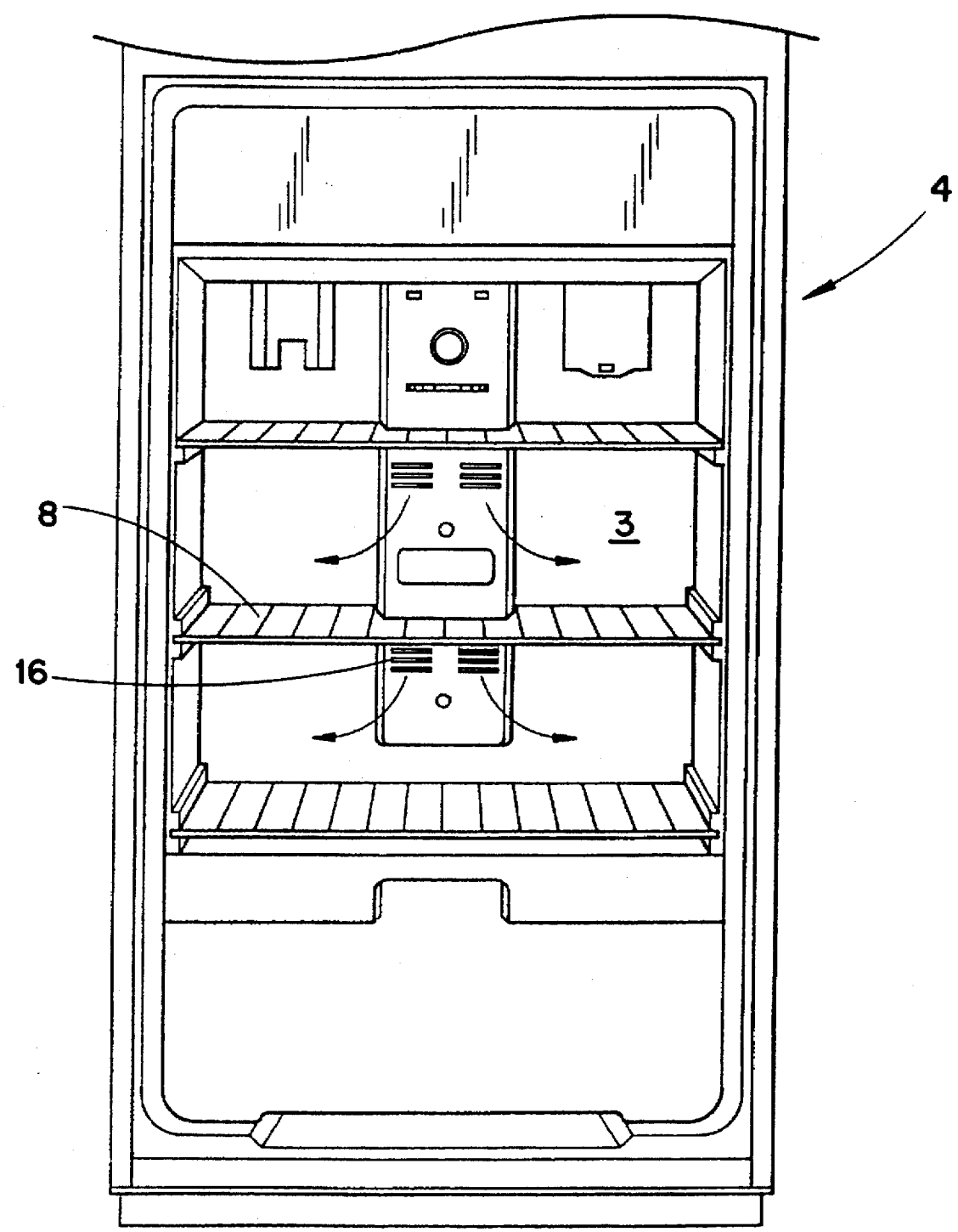
FIG. 2 is a front view showing the interior of a conventional refrigerator according to the shelf-by-shelf cool-air discharging method.
Figure 3:
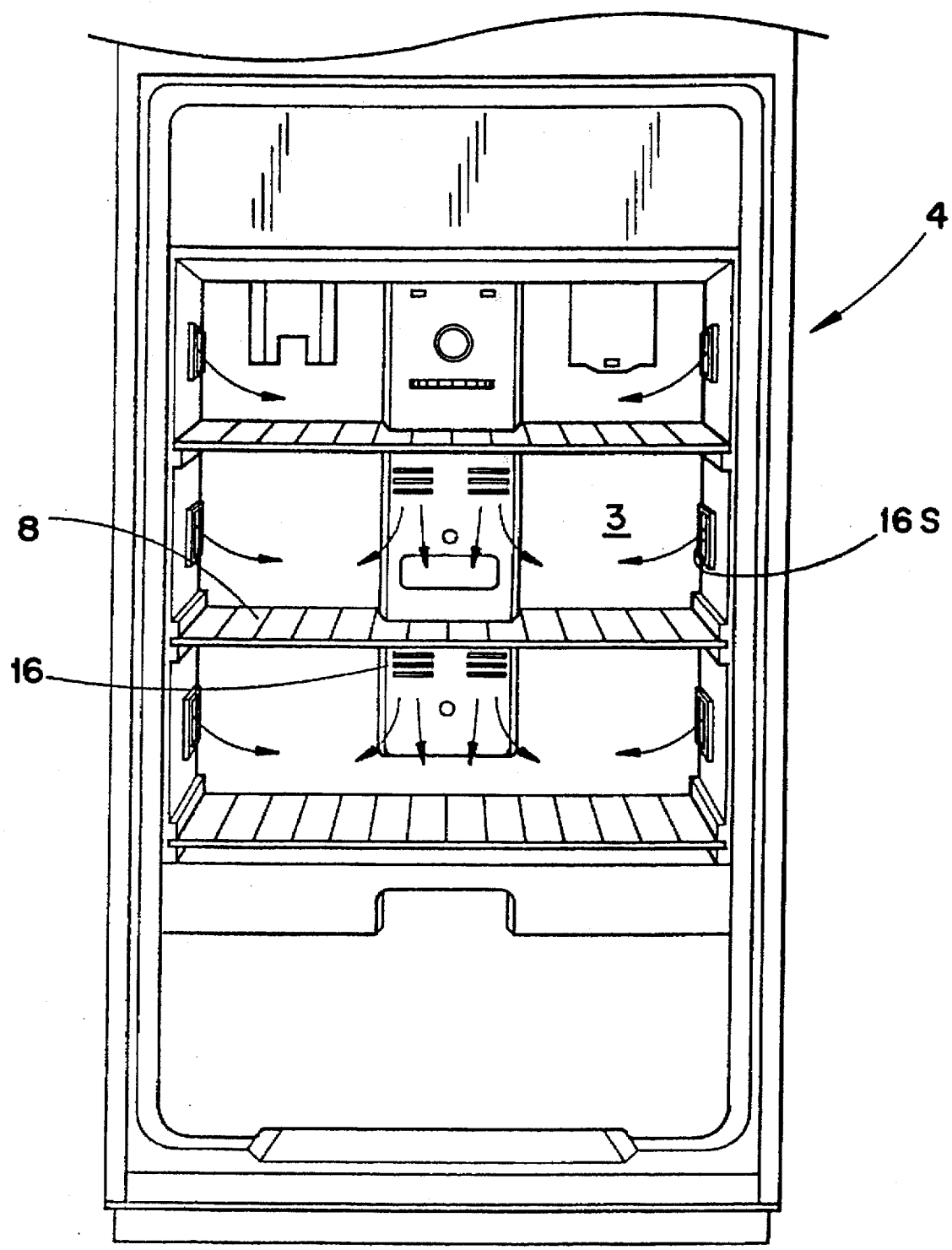
FIG. 3 is a front view showing the interior of a conventional refrigerator according to the three-dimensional cool-air discharging method.

Referring now to the drawings, the preferred embodiments according to this invention will be described in detail.

Figure 4:
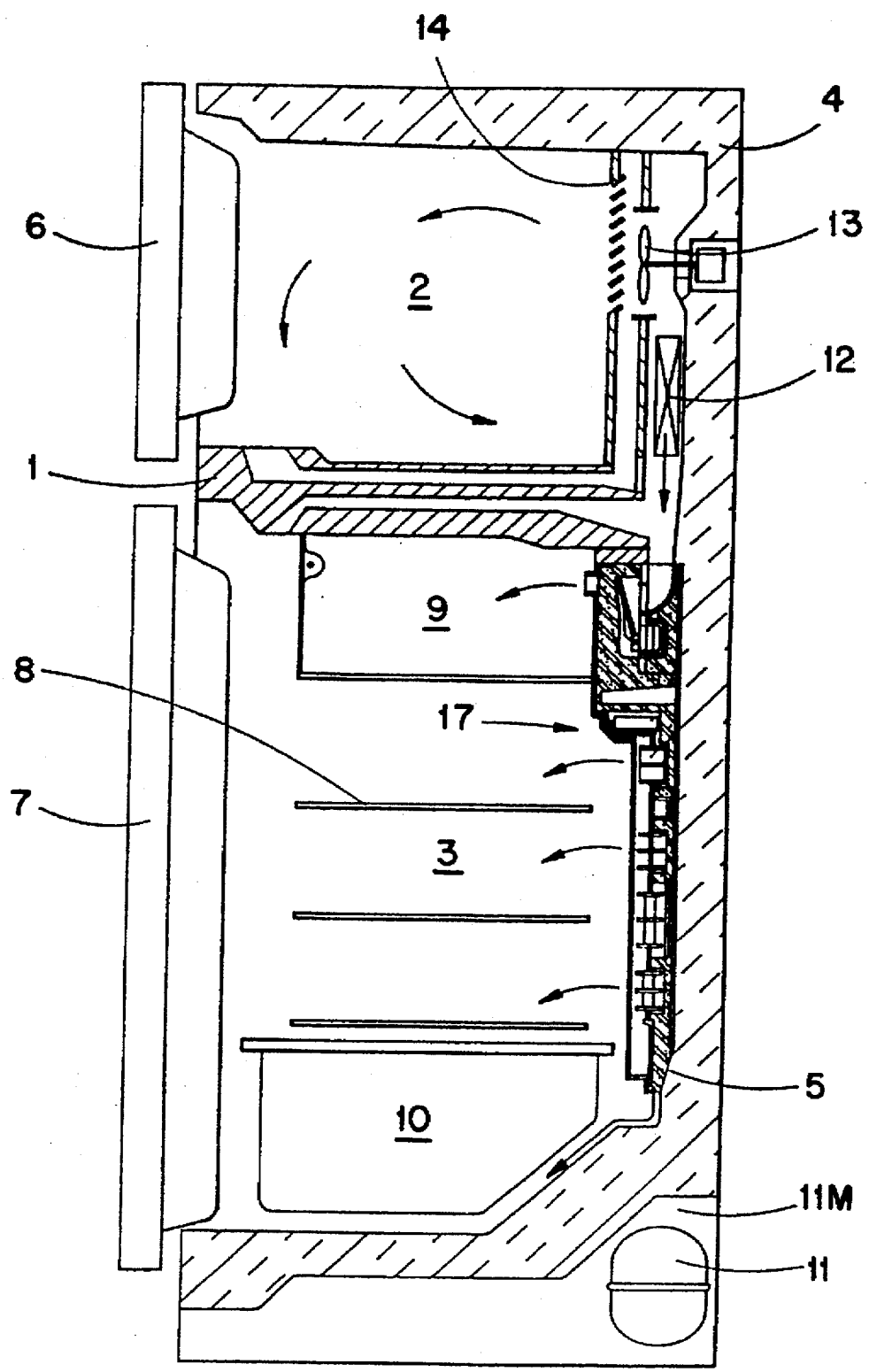
FIG. 4 is a longitudinal section showing the structure of a refrigerator according to this invention.

As shown in FIG. 4, the refrigerator according to this invention comprises a body 4 shielded by an insulating material which includes a freezing compartment 2 and a refrigerating compartment 3 which are divided by an intermediate wall 1, a door 6 for opening/closing the freezing compartment 2 and a door 7 for opening/closing the refrigerating compartment 3. A plurality of shelves 8 for placing foodstuffs thereon are installed in the refrigerating compartment. In the upper portion of the refrigerating compartment 3 a third compartment 9 is formed for allowing any special foodstuff to be stored in a specified temperature range. A vegetable compartment 10 is formed in the lowest portion of the refrigerating compartment 3. A compressor 11 is installed in the machine compartment 11M, and a condenser and pressure reducing device, which are not shown in this drawing, are installed within the wall of the body 4 or in the machine compartment 11M. An evaporator 12 is mounted on the rear wall of the freezing compartment 2. The above components are all interconnected by refrigerant tubes (not shown) so as to perform the refrigerating cycle.

Above the evaporator 12 a fan 13 is installed for blowing the cool air generated from the evaporator 12 into the freezing compartment 2 and the refrigerating compartment 3. In order to guide the cool air, a discharge grill 14 is mounted on the front of the fan 13, and a cool-air distribution apparatus 17 having cool-air passages and discharging openings, which will be explained later, is mounted on the rear wall of refrigerating compartment 3. Thus, the cool air generated by the evaporator 12 is supplied to the freezing compartment 2 and refrigerating compartment 3. Here, numeral 5 indicates a recess for housing the cool-air distribution apparatus 17.

Figure 5:
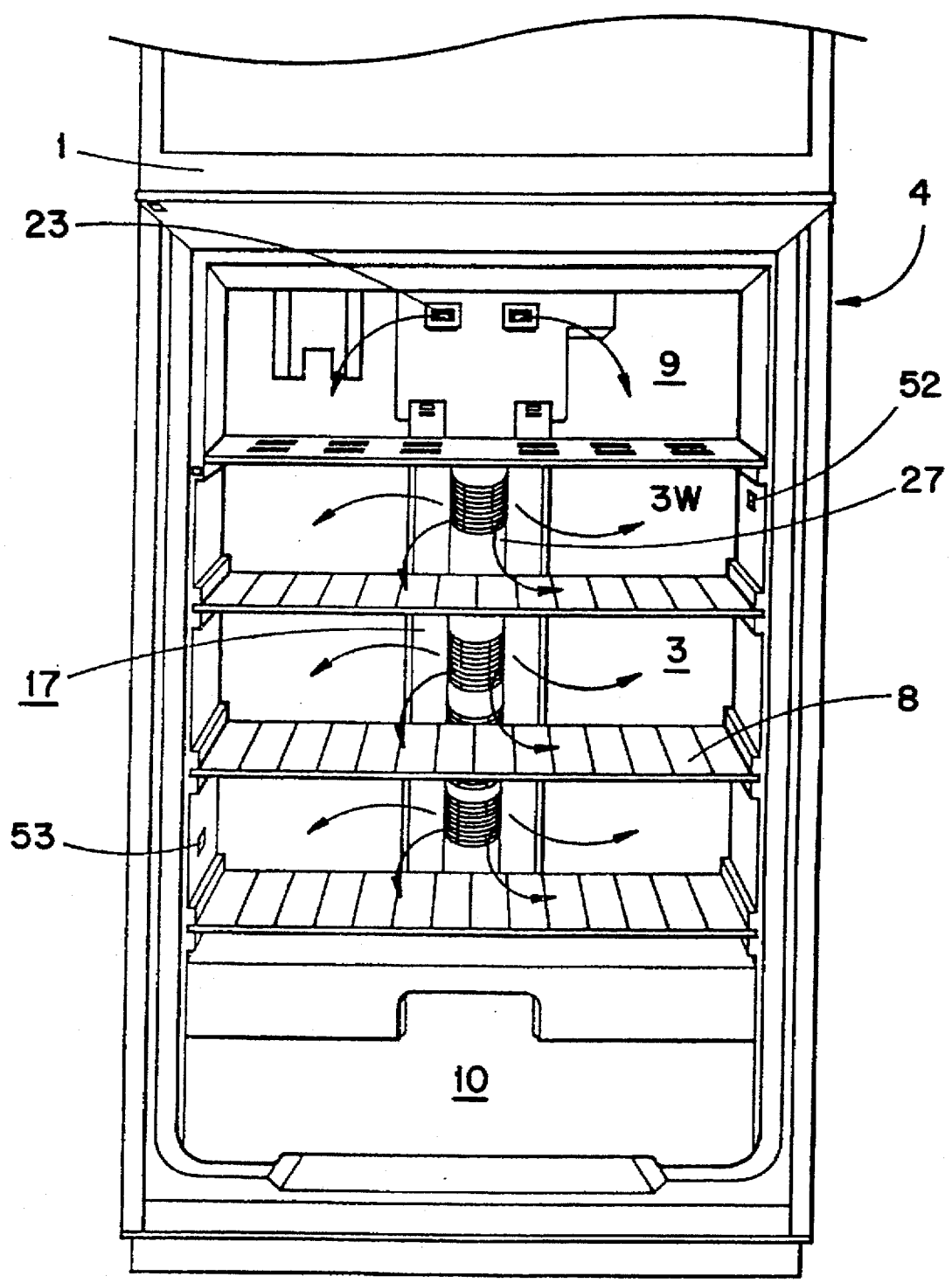
FIG. 5 is a front view showing the interior of a refrigerator according to this invention.

As shown in FIG. 5, the cool-air distribution apparatus 17 is installed in the horizontally central portion of the rear wall 3W of the refrigerating compartment 3. The upper portion of the cool-air distribution apparatus 17 is positioned on the back wall of the third compartment 9, while the middle and lower portions of the cool-air distribution apparatus 17 are positioned on the back wall of the refrigerating compartment 3 between the third compartment 9 and the vegetable compartment 10. That is, the upper end of the cool-air distribution apparatus 17 is placed adjacent to the intermediate wall 1, and the lower end thereof is placed adjacent to the vegetable compartment 10. Accordingly, The entire height of the cool-air distribution apparatus 17 equals approximately that of the refrigerating compartment 3 plus the third compartment 9.

Figure 6:
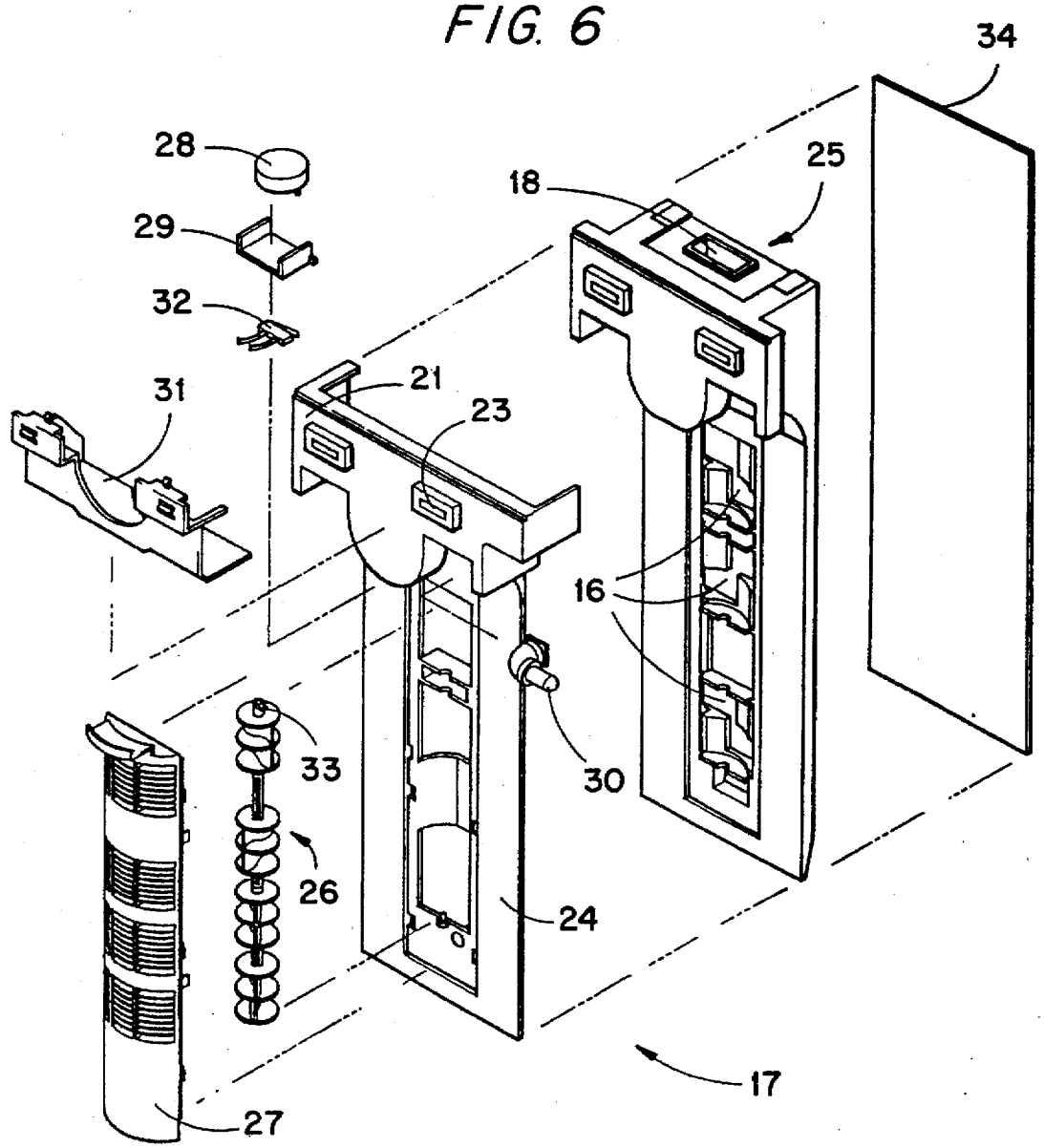
FIG. 6 is an exploded perspective view of a housing assembly including a cool-air duct of this invention.

The cool-air distribution apparatus 17, as shown in FIG. 6, comprises a front plate 24 made from a synthetic resin, a cool-air duct 25 which is made from an insulated material and assembled with the front plate 24, and a seal plate 34 covering the back surface of the cool-air duct 25. A swing wing 26 is detachably provided at the forefront surface of the cool-air duct 25. At the upper end of the swing wing 26 a motor 28 for rotating the swing wing 26 is provided. The motor 28, seated on a motor case 29, is installed in the upper portion of the front plate 24. On each side end of the motor 28 an indoor lamp 30 is mounted. Numeral 31 indicates the lamp cover for protecting the lamp. Numeral 32 indicates a position sensing switch for controlling the rotation position of the swing wing 26 which is turned "on/off" by a protuberance 33 provided on the upper end of the swing wing 26. Numeral 27 indicates a cool-air discharge grill which is detachably assembled to the front plate 24 for protection of the swing wing 26. The grill 27 prevents foodstuffs, housed in the compartment 3, from interrupting the rotation of the swing wing 26.

Figure 7:
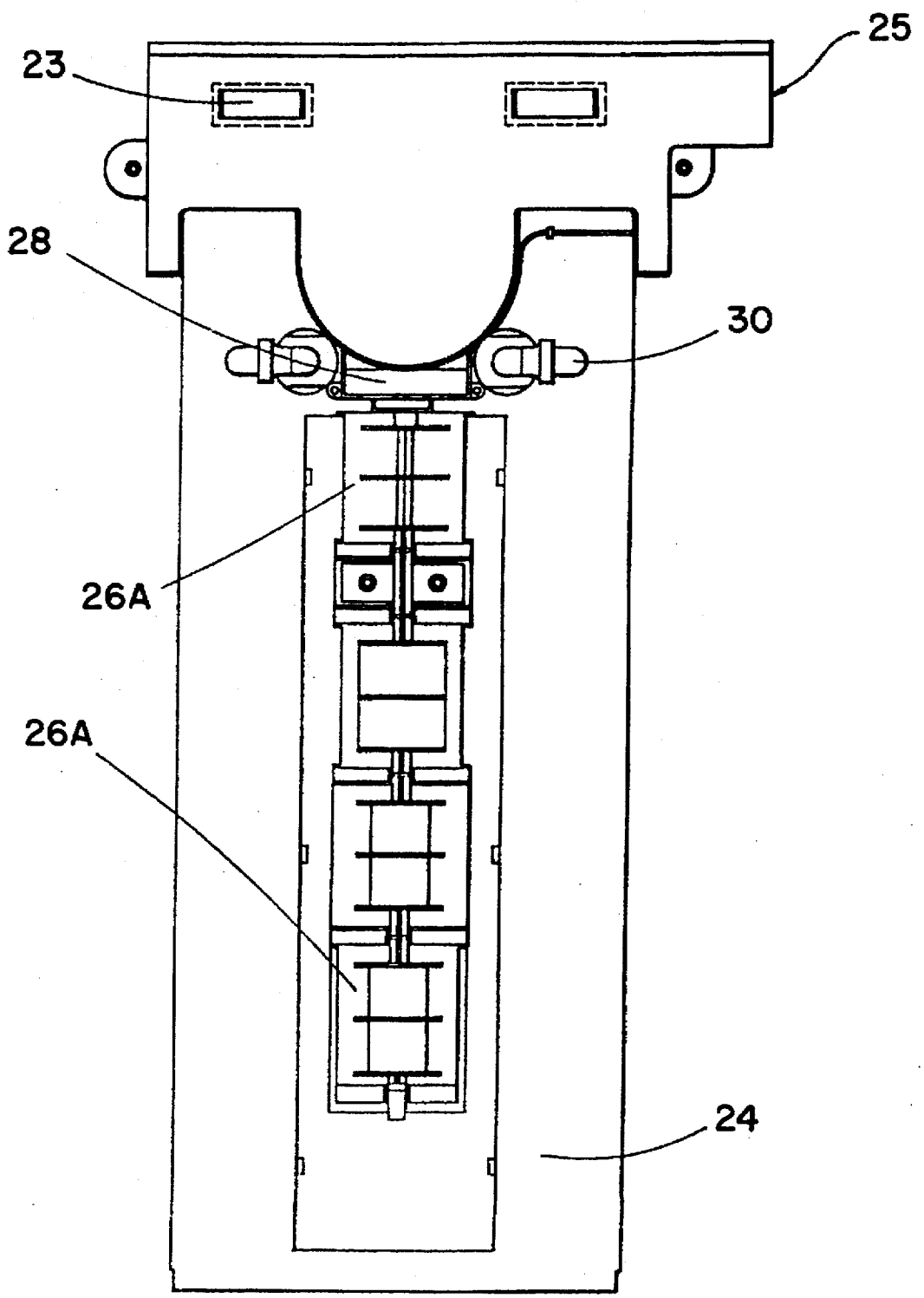
FIG. 7 is a front view of the housing assembly of FIG. 6.
Figure 8:
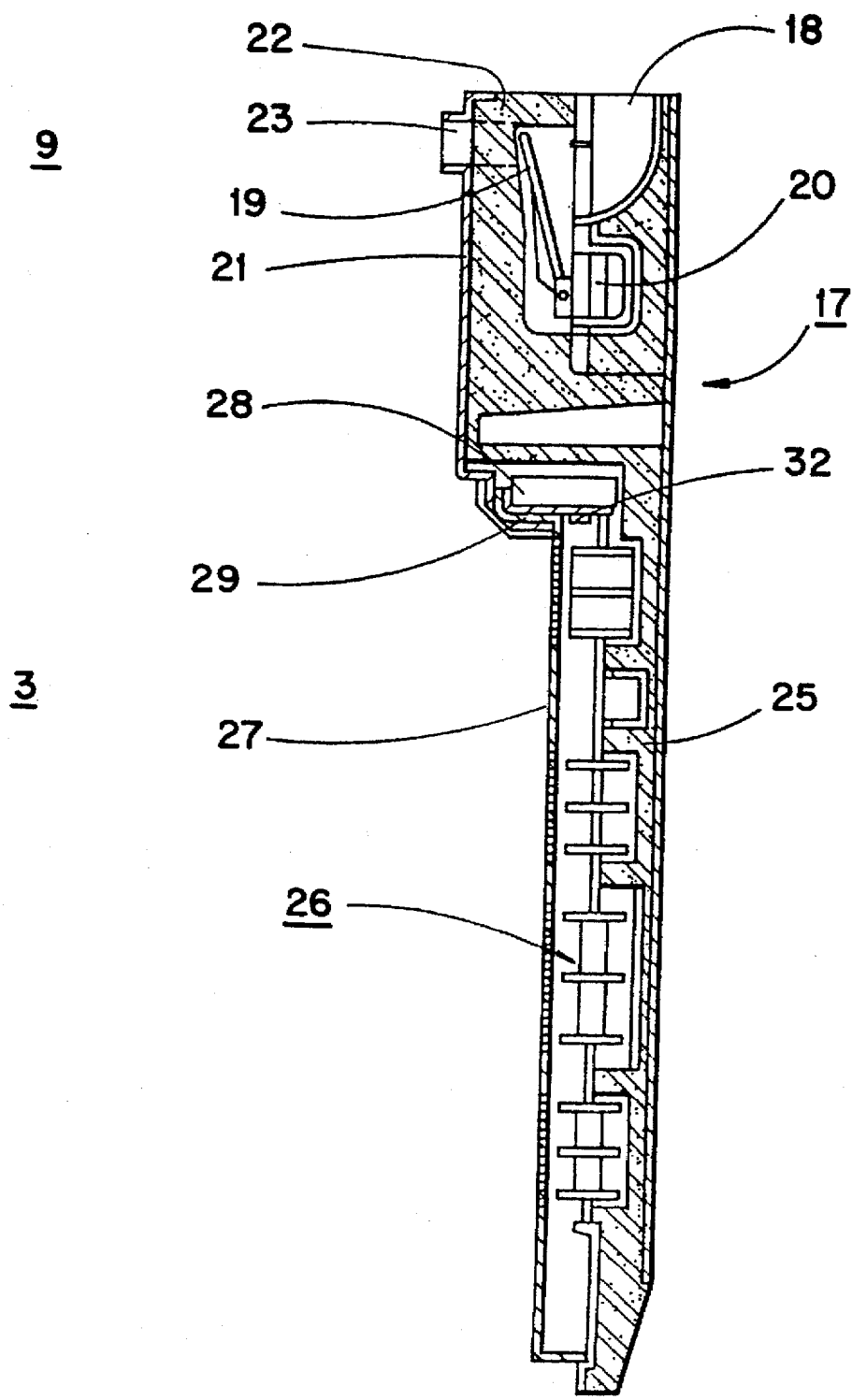
FIG. 8 is a side section of the housing assembly of FIG. 6.

As shown in FIGS. 7 and 8, at the upper end of the cool-air distribution apparatus 17 a cool-air inflow opening 18 for guiding the cool air generated from the evaporator 12 into the cool-air duct 25 is formed. A baffle plate 19 for regulating the amount of the cool air fed into the refrigerating compartment 3 and a motor 20 for operating the baffle plate 19 are mounted just under the cool-air inflow opening 18. The temperature control method using the baffle plate 19 is the same as a conventional method.

Numeral 21 designates a baffle cover that is integrally formed with the front cover 24, and numeral 22 designates a spacer that is made from an insulated material. Numeral 23 designates an air discharge opening which is provided on the upper portion of the front plate 24, through which the cool air from the cool-air inflow opening 18 is discharged into the third compartment 9. In this embodiment, a couple of the discharge opening 23 are formed on the upper portion of the front plate 24. The third compartment 9 can be maintained at a lower temperature than in the refrigerating compartment 3. This is because the travelling distance of the cool air from the cool-air inflow opening 18 to the air discharge opening 23 is shorter than that from the cool-air inflow opening 18 to the middle or lower portions of the cool-air distribution apparatus 17.

Figure 9A:
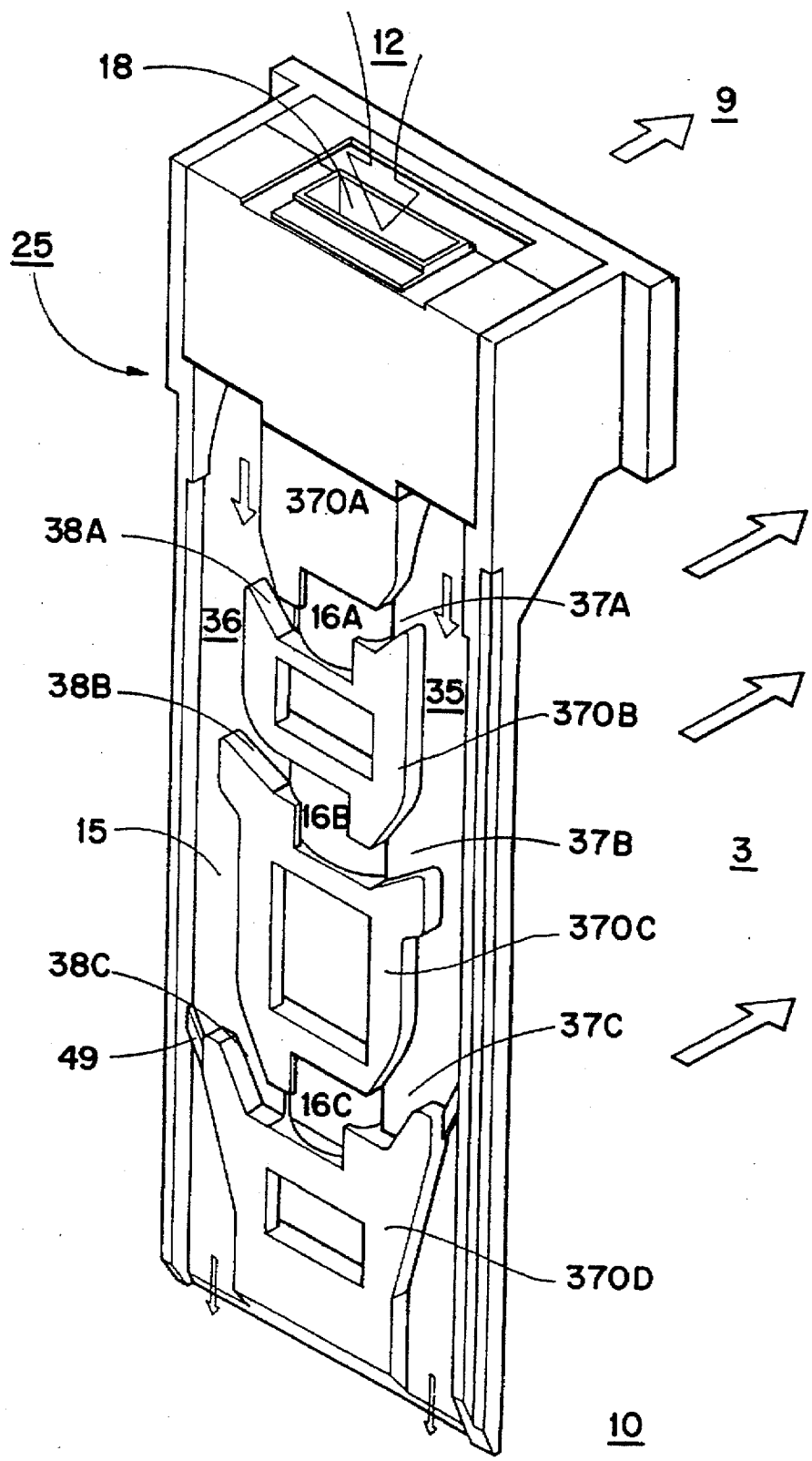
FIG. 9A is a perspective view of the cool-air duct according to this invention, showing a distinctive arrangement of cool-air passages and cool-air discharge openings.
Figure 9B:
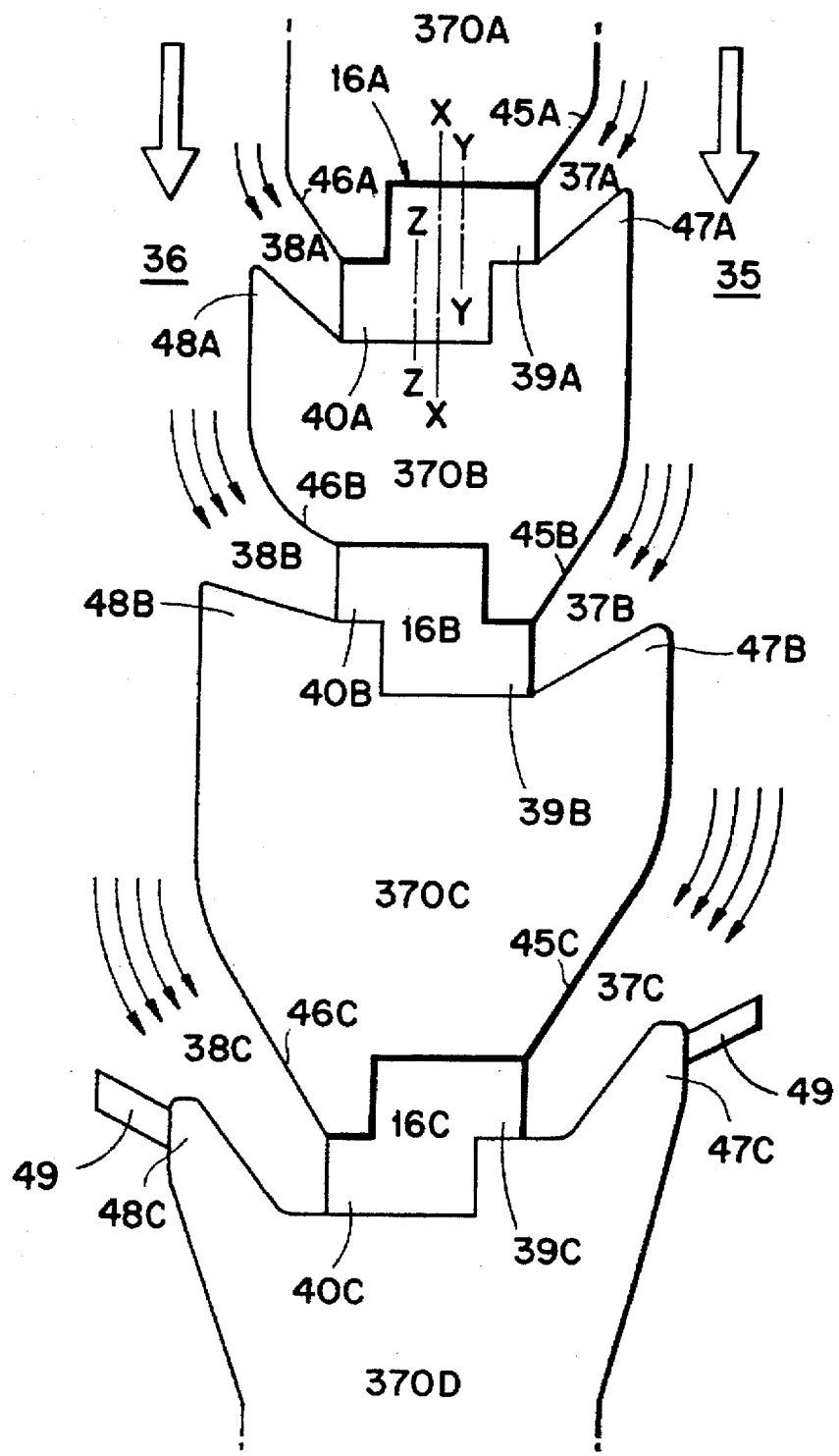
FIG. 9B is a schematic front view of the cool-air duct showing that cool air is introduced into the cool-air discharging openings from the cool-air passages.

As shown in FIGS. 9A and 9B, the cool-air duct 25 comprises the cool-air passage 15 and cool-air discharge openings 16A, B,C which guide the cool air from the evaporator 12 to the refrigerating compartment 3. The cool-air passage 15 comprises a first cool-air passage 35 and a second cool-air passage 36 which are formed in a longitudinal vertical direction on the right and left sides of the cool-air duct 25 for bisecting the cool air from the cool-air inflow opening 18. The cool-air discharge openings 16A, B,C are spaced in a longitudinal vertical direction along the vertical center line. That is, the cool-air discharge openings 16A, B,C are straddled by the first cool-air passage 35 and the second cool-air passage 36.

The respective openings 16A,16B and 16C are facing towards the spaces between each shelf 8, with the swing wing members 26A of the swing wing 26 (see FIG. 7) placed ahead of each opening 16.

As described above, because the cool-air passage 15 is divided into first and second cool-air passages 35,36, and the cool-air discharge openings 16A,16B,16C are positioned between the first and second cool-air passages 35,36, the cool-air duct 25 becomes thin. Accordingly, the available volume in the refrigerating compartment 3 increases.

The highest portions of the first and second cool-air passages 35,36 extend to the cool-air inflow opening 18, and their lowest portions extend to the vegetable compartment 10. With the baffle plate 19 open (FIG. 8), the cool air passing through the cool-air inflow opening 18 branches out to the first and second cool-air passages 35,36, and then it is discharged, in order, to the third compartment 9, the refrigerating compartment 3, and the vegetable compartment 10. In order to direct the cool air flowing down along the first and second cool-air passages 35,36 to the refrigerating compartment 3, the cool-air passage 15 further comprises first branch passages 37A, B,C which connect the first cool-air passage 35 to one side of respective cool-air discharge openings 16, and second branch passages 38A, B,C which connect the second cool-air passage 36 to one side of respective cool-air discharge openings 16. These first and second branch passages 37A, B,C and 38A,B,C are formed by means of a plurality of cool-air guiders 370A–D which project over and under the respective cool-air discharge openings 16. Accordingly, the cool air generated from the evaporator 12 flows down along the first and second cool-air passages 35,36, and then into the first branch passages 37A, B,C, second branch passages 38A, B,C, and finally discharged into the refrigerating compartment 3 through the cool-air discharge openings 16A, B,C.

As shown in FIG. 9B, the branch passages have a configuration such that their inlet portions, which join the cool-air passages 35,36, are relatively wide, and their outlet portions, which join the cool-air discharge openings 36, are relatively narrow. The lower ends 45A,46A of the cool-air guider 370A, which form the inlet portions of the first and second branch passages 37A,38A, are rounded. The upper ends (shoulders 47A, 48A) of the cool-air guider 370B extend out towards the first and second cool-air passages 35,36 (the right and left sides of FIG. 9B) farther than the lower ends 45A,46A of the cool-air guider 370A. In the same manner, the lower ends 45B,46B of the cool-air guider 370B are rounded. The upper ends(shoulders 47B,48B) of the cool-air guider 370C extend out towards the first and second cool-air passages 35,36 (the right and left sides of FIG. 9B) farther than the lower ends 45B,46B of the cool-air guider 370B. The cool-air guiders 370C and 370D also have the same configuration as the above. By using such a configuration, the cool air flowing down along the first and second cool-air passages 35,36 is evenly distributed to each of the branch passages 37,38.

It is more desirable to have the rounding length of the lower ends 45B,46B of the middle cool-air guider 370B longer than the lower ends 45A,46A of the upper cool-air guider 370A, and the rounding length of the lower ends 45C,46C of the lower cool-air guider 370C longer than that of the middle cool-air guider 370B. It is also more desirable to have the shoulders 47B,48B extend out towards the first and second cool-air passages 35,36 farther than the shoulders 47A,48A, and to have the shoulders 47C,48C extend out towards the first and second cool-air passages 35,36 farther than the shoulders 47B,48B.

The cool air in the lower portion of the first and second cool-air passages 35,36 has a warmer temperature than the cool air in the upper portion of the first and second cool-air passages 35,36 because of being heat-exchanged with surrounding air for more time. Therefore, the lower portion of the refrigerating compartment 3 needs more cool air than the upper portion to eliminate the difference in temperature. The above problem can be solved by discharging less cool air through the upper branch passages 37A, 38A than through the middle branch passages 37B,38B, and by discharging less cool air through the middle branch passages 37B,38B than through the lower branch passages 37C,38C. Therefore, by means of the cool-air duct according to this invention, the entire space of the refrigerating compartment 3 can be maintained at a uniform temperature.

At the lower ends of the first and second cool-air passages 35,36, or more exactly, just below the inlet portions of the lowest first and second branch passages 37C,38C, flanges 49 having a predetermined height are provided for both reducing the air rate supplied to the vegetable compartment 10 and for increasing the air rate supplied to the refrigerating compartment 3 through the cool-air discharge openings 16. Hence, the temperature of the refrigerating compartment 3 stays cooler than the vegetable compartment 10.

Furthermore, in order to discharge the cool air into the refrigerating compartment 3 in the right and left directions, the opening 16A comprises a first discharge portion 39A connected to the first branch passage 37A, and a second discharge portion 40A connected to the second branch passage 38A. It is more desirable to have the first and second discharge portions 39A,40A joined to each other, while forming individual flow passages by dividing the cool-air discharge opening 16A into an upper portion and lower portion in order that the cool air from the first cool-air passage 35 does not encounter the cool air from the second cool-air passage 36 at the cool-air discharge opening 16A. That is, the left side 46A of the lower end of the cool-air guider 370A extends upwards toward the air passage 36 from the top of the cool-air discharge portion 40A, and the right shoulder 47A of the cool-air guider 370B extends upwards toward the air passage 35 from the bottom of the cool-air discharge portion 39A. Therefore, the cool air flow guided by the first cool-air passage 35 and the cool air flow guided by the second cool-air passage 36 are smoothly discharged to the refrigerating compartment 3 through the discharge portions 39A and 40A, respectively, without ever colliding with each other. That is, the cool air introduced into the first discharge portion 39A is discharged at the left side of the opening 16A (see FIG. 9B), and the cool air introduced into the second discharge portion 40A is discharged at the right side, without ever encountering each other.

In FIG. 9B, the line X—X indicates the vertical center line of the cool-air discharge opening 16A, the line Y—Y indicates the vertical center line of the first discharge portion 39A, and the line Z—Z indicates the center line of the second discharge portion 40A. As can be seen, discharge portions 39A,40A overlap horizontally, and the first discharge portion 39A is offset to the right side, and the second discharge portion 40A is offset to the left side.

The arrangement of the first and second discharge portions 39B,40B in the cool-air discharge opening 16B, neighboring the opening 16A, is reversed with respect to that of the first and second discharge portions 39A,40A. That is, in the opening 16A the first discharge portion 39A is positioned on the second discharge portion 40A, while in the opening 16B the second discharge portion 40B is positioned above the first discharge portion 39B. Of course, the arrangement of the first and second discharge portions 39C,40C in the cool-air discharge opening 16C, neighboring the opening 16B, is reversed with respect to that of the first and second discharge portions 39B,40B. As aforementioned, the cool air becomes gradually warmer as it flows downwardly along the passage 15. In order to compensate for such a temperature gradient, the first branch passage 37A and the first discharge portion 39A are arranged higher than the second branch passage 38A and the second discharge portion 40A; the second discharge portion 40B are arranged higher up than the first branch passage 37B and the first discharge portion 39B. In other words, the branch ducts associated with either of the air passages 35,36 are arranged such that vertically alternate ones of those branch ducts intersect their respective discharge portions at the higher level. In the same manner, the first branch passage 37C and the first discharge portion 39C are arranged higher than the second branch passage 38C and the second discharge portion 40C.

By using such a configuration, wherein the first air flow to reach a given opening 16A–C is discharged into the refrigerating compartment at a higher level than the second air flow to reach that opening, the difference in the temperature between the right and left sides of the refrigerating compartment 3 can be eliminated. Therefore, uniform cooling in the refrigerating compartment 3 is achieved.

The operation of a refrigerator having the above described cool-air duct will now be explained below.

First, in FIG. 4 when the compressor 11 and the evaporator 12 are in operation, cool air is generated by the heat-exchange of the evaporator 12 and the conducted air. The cool air moves into the freezing compartment 2 and the refrigerating compartment 3 by the fan 3, as indicated by the arrow in FIG. 4. The opening/shutting operation of the baffle plate 19 (FIG. 8) is controlled depending on the temperature of the refrigerating compartment 3. As the baffle plate 19 is opened, cool air from the evaporator 12 is fed into the cool-air inflow opening 18. Then the cool air flows down along the first and second cool-air passages 35,36 dividing into the right and left sides of the cool-air duct 25 as shown in FIGS. 9A and 9B. After that, a portion of the cool air is discharged into the third compartment 9 through the cool-air discharge opening 23(FIG. 5), while the remainder of the cool air is discharged into the refrigerating compartment 3 and the vegetable compartment 10.

In the process of discharging the cool air into the refrigerating compartment 3, cool air flowing down along the first and second cool-air passages 35,36 from the top of the cool-air duct 25 to the bottom, is guided to the respective cool-air discharge openings 16 by the respective first and second branch passages 37,38. It then is discharged into the refrigerating compartment 3. As aforementioned, because each cool-air discharge opening 16 comprises first and second discharge portions, which are joined to each other but form independent air-conducting paths by means of the cool-air guiders 370A–D, the cool air introduced into the right (first) cool-air discharge portions 39A–C and the cool air introduced into the left (second) cool-air discharge portions 40A–C are discharged along different paths into the refrigerating compartment 3 without ever encountering one another. That is, the cool air introduced into the first discharge portion 39A heads toward the left side of FIG. 9A, while the cool air introduced into the second discharge portion 40A heads toward the right side of FIG. 9A. Consequently the cool air is evenly distributed throughout the refrigerating compartment 3.

Further, the arrangement of the first and second discharge portions 39B,40B in the middle cool-air discharge opening 16B is reversed with respect to that of the first and second discharge portions 39A,40A of the upper cool-air discharge opening 16A. Also, the arrangement of the first and second discharge portions 39C,40C of the lower cool-air discharge opening 16C is reversed with respect to that of the first and second discharge portions 39B,40B of the middle cool-air discharge opening 16B. Therefore, in the upper cool-air discharge opening 16A the temperature of the cool air from the right side (the first cool-air passage 35) is lower than that from the left side (the second cool-air passage 36), because, the right side air has not traveled as far downwardly as the left side air due to the vertically offset relationship of the branch passages 37A, 38A. Likewise, in the middle cool-air discharge opening 16B the temperature of the cool air from the left side is lower than that from the right side, and in the lower cool-air discharge opening 16C the temperature of the cool air from the right side is lower than that from the left side, so that the difference of the temperature in the right and left sides of the refrigerating compartment 3 is eliminated and uniform cooling of the foodstuffs stored is achieved.

Furthermore, the middle shoulders 47B,48B extend outwardly toward the first and second passages 35,36 farther than the upper shoulders 47A, 48A, and the lower shoulders 47C,48C extend outwardly toward the first and second passages 35,36 farther than the middle shoulders 47B,48B. Therefore, even though the temperature of the cool air in the upper portion of the cool-air passage 15 is higher than that of the lower portion, more of the cool air is discharged into the refrigerating compartment 3 through the middle cool-air opening 16B than through the upper cool-air opening 16A, and more cool air is discharged through the lower cool-air opening 16C through than the middle cool-air opening 16B. Therefore, the difference of the temperature in the upper and lower sides of the refrigerating compartment 3 is eliminated and uniform cooling of the foodstuffs stored is achieved.

Figure 10:
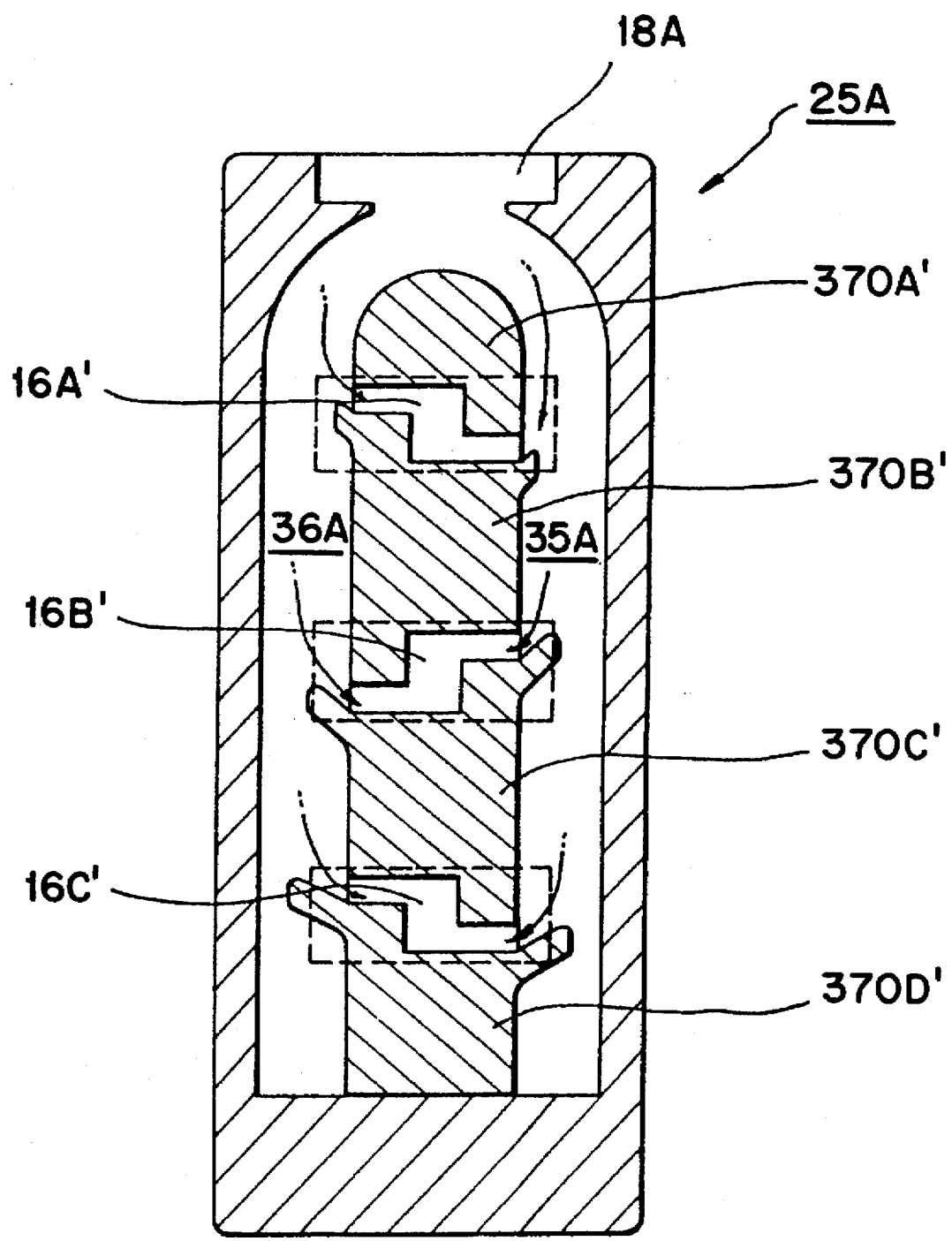
FIGS. 10 and 11 are sectional views of other cool-air ducts according to this invention, showing distinctive arrangements of cool-air passages and cool-air discharge openings.
Figure 11:
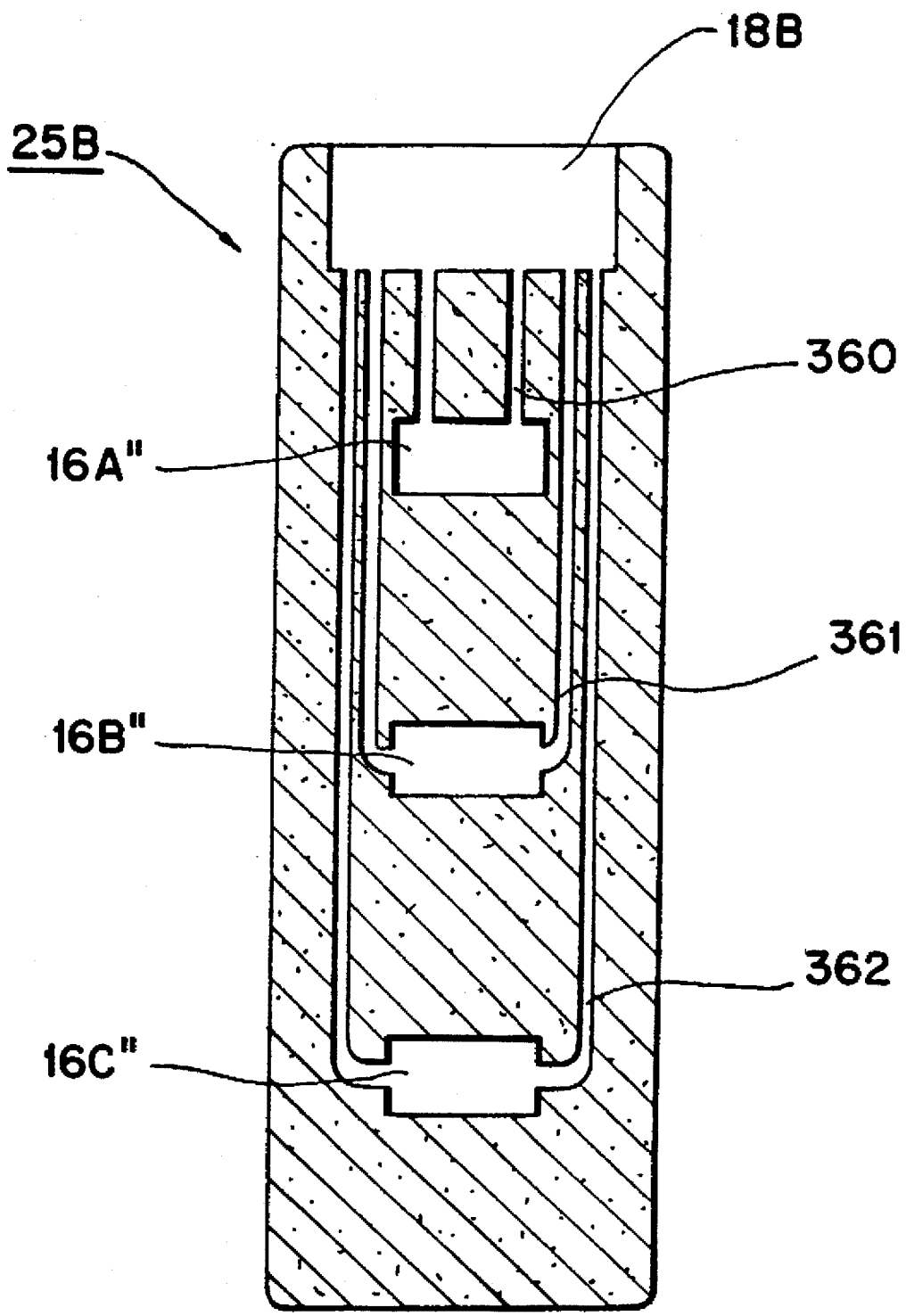

FIGS. 10 and 11 show other embodiments of this invention. In a cool-air duct 25A shown in FIG. 10 (and explained in detail in connection with the embodiment of FIGS. 1–9), the cool air is introduced into a cool-air inflow opening 18A and divided into the right and left sides by a plurality of cool-air guiders 370A',370B',370C' and 370D'. It then is discharged into the refrigerating compartment 3 through cool-air discharge openings 16A',16B' and 16C'. The points of difference between the cool-air duct 25A of this embodiment and the cool-air duct 25 of the first embodiment are that the lower portions of each cool-air guider in the cool-air duct 25A are not rounded, and the cool-air duct 25A has no flange 49 between the lowest cool-air guider 370D' and the respective cool-air passages 35A, 36B. Except for the above points of difference, the structure of this cool-air duct 25A is generally the same as the cool-air duct 25 of the first embodiment, so any further explanation is omitted.

A cool-air duct 25B shown in FIG. 11 does not have any common cool-air passages for connecting a cool-air inflow opening 18B to the respective cool-air discharge openings 16A",16B" and 16C". On the other hand, a first cool-air passage 360 connects the upper cool-air discharge opening 16A" to the cool-air inflow opening 18B, a second cool-air passage 361 connects the middle cool-air discharge opening 16B" to the cool-air inflow opening 18B, and a third cool-air passage 362 connects the lower cool-air discharge opening 16C" to the cool-air inflow opening 18B. The passages 360,361,362 are formed independently from each other. By using such a structure, the purpose and effect of this invention can also be accomplished.

Figure 12:
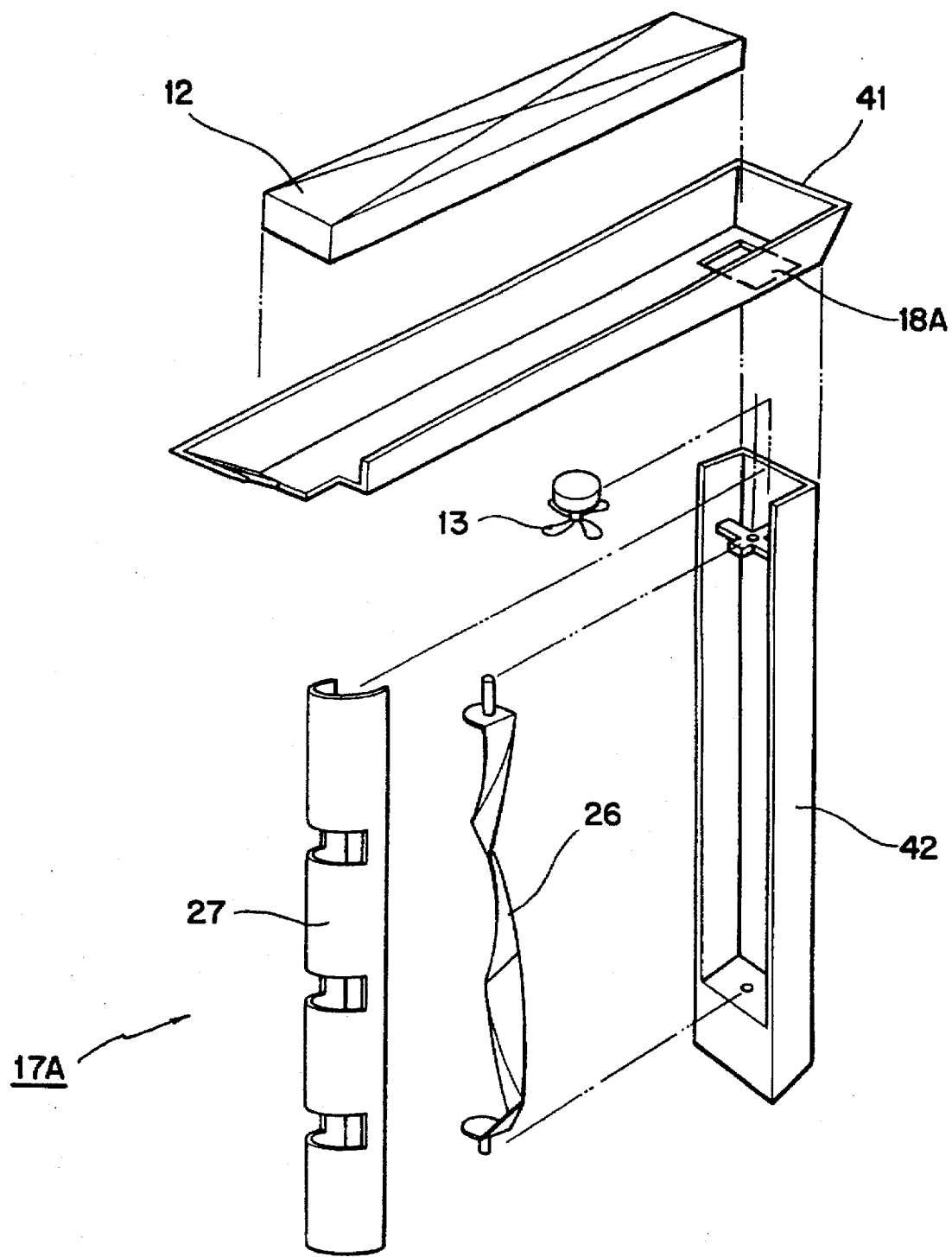
FIGS. 12 and 13 are views showing various housing assemblies in which the cool-air ducts according to this invention can be mounted.
Figure 13:
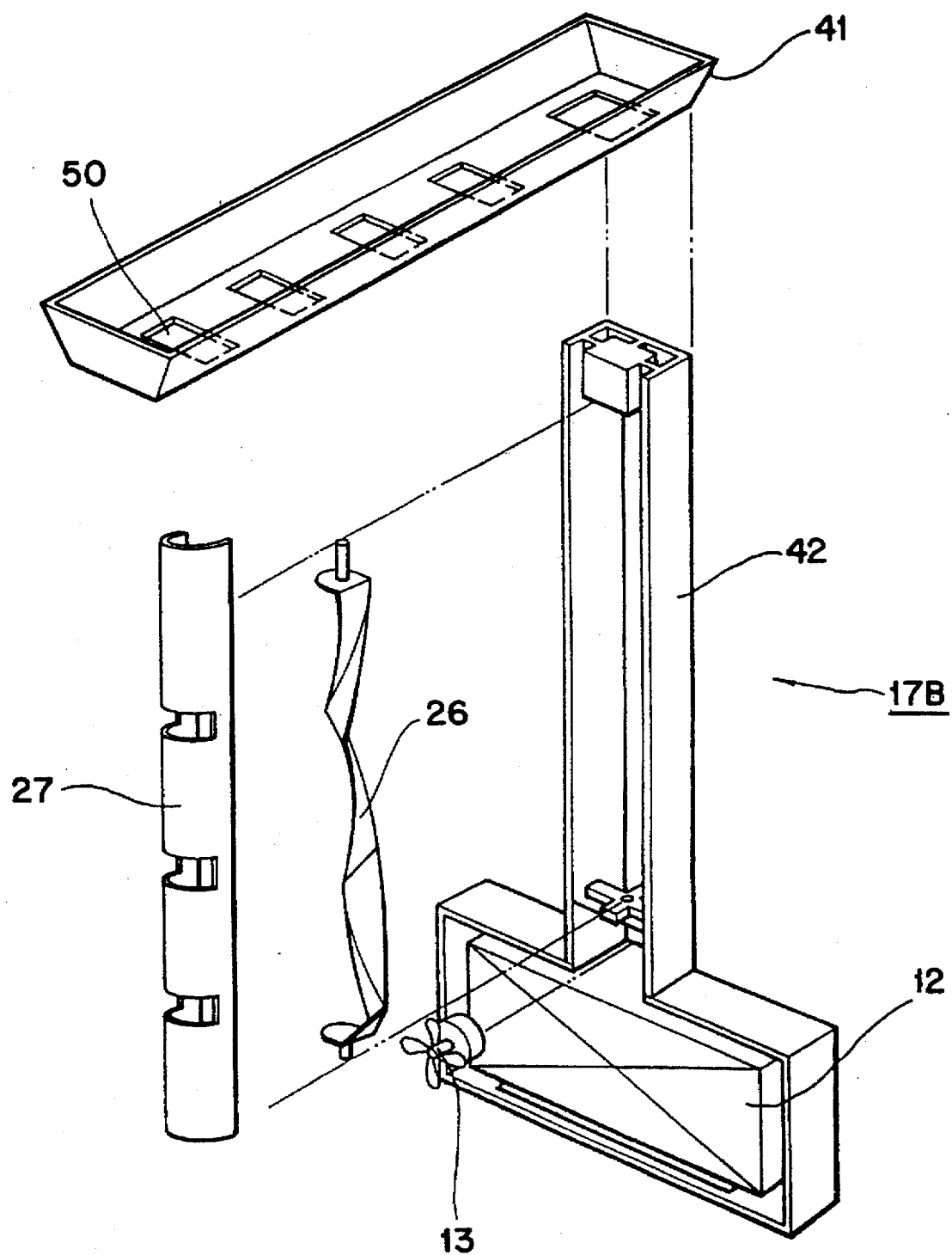

FIGS. 12 and 13 show various housing assemblies for distributing cool air to the refrigerating compartment 3 on which the cool-air ducts according to this invention can be mounted.

In a housing 17A shown in FIG. 12, a cool-air discharge grill 27 is installed on the front of a lower cover 42 and a rotary type swing wing 26 is disposed between the grill 27 and the lower cover 42. Arranged on the lower cover 42 is an upper cover 41 on which an evaporator 12 is mounted. A cool-air inflow opening 18A is formed on the rear portion of the upper cover 41 to communicate the upper cover 41 with the lower cover 42. Just under the cool-air inflow opening 18A or at the top of the lower cover 42, a fan 13 is installed. When any one of the cool-air ducts 25,25A,25B according to this invention is disposed in the lower cover 42 of the housing 17A, the cool air generated from the evaporator 12 is efficiently guided by the cool-air duct and discharged into the refrigerating compartment 3 through the discharge grill 27. Accordingly, the purpose and effect of this invention can also be accomplished.

In the housing 17B shown in FIG. 13, which is similar to the housing 17A of FIG. 12, the evaporator 12 and the fan 13 are disposed at the lower portion of the lower cover 42B. A plurality of cool-air discharge openings 50 are formed on the upper cover 41B so as to discharge the cool air toward the bottom from the top of the refrigerating compartment 3. The cool-air ducts according to this invention can also be mounted in the housing 17B to obtain the purpose and effect of this invention.

As explained in detail, the cool-air duct according to this invention can maintain the foodstuffs at a uniform temperature irrespective of the stored positions of the foodstuffs. This is because the cool air flows down along opposite air passages and is distributed to their respective cool-air discharge openings at the proper amount in such a manner that more of the cool air is discharged through the lower cool-air discharge opening than the higher one among the three cool-air discharge openings.

Further, this invention causes the cool air to circulate evenly in every direction of the refrigerating compartment without flow loss. This is because the cool air flowing down along opposite air passages is efficiently directed to the cool-air discharge openings by the cool-air guiders and is discharged toward the right and left sides of the refrigerating compartment from the upper and lower discharge portions of each cool-air discharge opening. Therefore, even if a bulky foodstuff is placed adjacent to the cool-air discharge opening, the cool-air circulation in the refrigerating compartment can be accomplished regardless.

Furthermore, the decrease in the available space due to the installation of the cool-air duct can be prevented because the thickness of the cool-air duct is pretty much reduced by the configuration of the cool-air duct according to this invention.

What is claimed is:

1. A refrigerator comprising:

a freezing compartment;

a refrigerating compartment;

an evaporator for generating cool air;

a fan for circulating the cool air to the freezing and refrigerating compartments; and a cool air duct disposed on a rear wall of the refrigerating compartment for guiding cool air to the refrigerating compartment, the cool air duct including first and second generally vertical air passages spaced apart horizontally for conducting respective portions of the cool air downwardly, a vertically spaced plurality of discharge openings disposed between the air passages and communicating with the refrigerating compartment, each discharge opening including first and second discharge portions situated horizontally adjacent one another, and vertically spaced branch ducts connecting each air passage with respective discharge openings, such that the first discharge portion of each discharge opening is connected to the first passage by a first branch duct, and the second discharge portion of each discharge opening is connected to the second passage by a second branch duct, one of the first and second branch ducts intersecting its respective air passage at a level higher than a level at which the other branch duct intersects its respective air passage, the one branch duct intersecting its respective discharge portion at a level higher than a level at which the other branch duct intersects its respective discharge portion.

2. The refrigerator according to claim 1, wherein each branch duct includes vertically spaced upper and lower walls, the upper wall including a curved portion intersecting a respective air passage, and the lower wall including a shoulder intersecting a respective air passage.

3. The refrigerator according to claim 2, wherein the lower wall of each branch duct projects into the respective air passage farther than the upper wall.

4. The refrigerator according to claim 3, wherein the lower wall of each branch duct projects into the respective air passage farther than a lower wall of a branch duct disposed immediately thereabove.

5. The refrigerator according to claim 1, wherein the branch ducts associated with each air passage are arranged such that vertically alternated ones of the branch ducts intersects its respective discharge portion at the higher level.

6. The refrigerator according to claim 1, wherein a lowermost branch duct associated with each air passage includes a flange projecting into the respective air passage, a lower end of each air passage disposed below the respective flange opening into a portion of the refrigerating compartment.

7. The refrigerator according to claim 1, wherein the discharge portion of each discharge opening which is intersected by the higher-level branch duct extends higher than the other discharge portion of that discharge opening.

* * * * *